United States Patent [19]
Busick

[11] Patent Number: 6,062,255
[45] Date of Patent: May 16, 2000

[54] FLOAT VALVE ASSEMBLY FOR A WATER PURIFICATION SYSTEM

[75] Inventor: Louis M. Busick, Columbus, Ohio

[73] Assignee: Oasis Corporation, Columbus, Ohio

[21] Appl. No.: 09/141,293

[22] Filed: Aug. 27, 1998

[51] Int. Cl.$^7$ .......................... F16K 31/22; F16K 33/00; B01D 61/08
[52] U.S. Cl. .......................... 137/390; 137/423; 137/448; 137/550; 210/110; 210/123; 210/128; 210/134; 210/420
[58] Field of Search ..................... 137/416, 418, 137/419, 423, 448, 549, 550, 389, 390; 210/110, 123, 134, 195.2, 321.6, 321.72, 321.78, 420, 416.3, 128, 418

[56] References Cited

U.S. PATENT DOCUMENTS

| | | |
|---|---|---|
| 2,022,164 | 11/1935 | Sweetland . |
| 2,495,878 | 1/1950 | Tull . |
| 2,623,367 | 12/1952 | Morrison . |
| 2,809,800 | 10/1957 | Ahl . |
| 3,254,504 | 6/1966 | Thomas . |
| 3,456,803 | 7/1969 | Rak . |
| 3,608,579 | 9/1971 | Moore . |
| 3,982,406 | 9/1976 | Hanson et al. . |
| 4,207,994 | 6/1980 | Offlee, Sr. . |
| 4,436,109 | 3/1984 | Taylor ..................................... 137/448 |
| 4,577,657 | 3/1986 | Alexander ............................... 137/448 |
| 4,599,166 | 7/1986 | Gesslauer . |
| 4,776,952 | 10/1988 | Burrows ................................. 210/110 |
| 4,792,059 | 12/1988 | Kerner et al. ............................. 222/67 |
| 4,946,599 | 8/1990 | Craig ....................................... 210/741 |
| 5,003,790 | 4/1991 | Goupil ..................................... 62/397 |
| 5,045,197 | 9/1991 | Burrows ............................. 210/321.78 |
| 5,064,097 | 11/1991 | Brog et al. ........................... 222/146.1 |
| 5,083,442 | 1/1992 | Vlock ........................................ 62/338 |
| 5,244,009 | 9/1993 | Raab et al. ............................... 137/613 |
| 5,269,442 | 12/1993 | Vogel .................................... 222/129.1 |
| 5,285,815 | 2/1994 | Henry et al. ............................. 137/595 |
| 5,336,406 | 8/1994 | Stanford et al. ........................ 210/235 |
| 5,607,083 | 3/1997 | Vogel et al. .......................... 222/129.1 |

Primary Examiner—George L. Walton
Attorney, Agent, or Firm—Kelly Bauersfeld Lowry and Kelley, LLP

[57] ABSTRACT

A float valve assembly is provided for regulating water inflow to a purification module of a water purification system, such as a reverse osmosis purification module or the like. The float valve assembly is mounted within a reservoir for receiving and storing relatively purified water produced by the purification module, and includes a valve unit defining a vertically extending flow path from a tap water source to the purification module. A primary float responds to rising and falling water level within the reservoir for respectively closing and opening a primary banjo valve mounted along the flow path. A secondary banjo valve is mounted along the flow path at a location above the primary valve, and, in the event of primary valve malfunction, is closed by a secondary float responsive to rising reservoir water level. In a preferred form, the secondary valve remains closed upon subsequent descent of the water level, and is manually re-opened by depression of a reset button.

31 Claims, 5 Drawing Sheets

FLOAT VALVE ASSEMBLY FOR A WATER PURIFICATION SYSTEM

BACKGROUND OF THE INVENTION

This invention relates generally to improvements in water purification systems of the type including a purification element or module for producing a supply of relatively purified water which is stored in a reservoir for convenient dispensing through a faucet valve or the like. More particularly, this invention relates to an improved mechanical float valve assembly for controlling water inflow to the purification element or module in response to the water level within the storage reservoir.

Water purification systems of the type including one or more purification elements or modules in the form of filters and/or reverse osmosis units are generally well known in the art for producing a relatively purified water supply used for drinking, cooking, etc. For example, such purification systems commonly include a reverse osmosis filter or membrane which, in the presence of appropriate flow and pressure conditions, separates an incoming tap or feed water supply into the purified water supply and a relatively impure or reject water supply. In particular, the reverse osmosis membrane functions to remove particulate matter and a wide range of dissolved solids and other contaminants from a portion of the tap water inflow, and to concentrate those contaminants within the reject supply, often referred to as brine, for waste disposal via a suitable drain. The purified water supply is normally collected for storage within a reservoir, and for ready dispensing on demand through a faucet valve or the like.

One potential disadvantage associated with reverse osmosis purification systems relates to the inherent waste of at least a portion of the tap water inflow, by virtue of the flow of the concentrated brine water to the drain site. This disposal of a portion of the tap water inflow is generally acceptable during normal system operation to produce purified water, during filling of the storage reservoir. However, when the reservoir reaches a filled or substantially filled condition, there is typically at least some continued flow of water through the reverse osmosis membrane to the drain, wherein the amount of water wasted during this condition can be significant and undesirable.

In the past, reverse osmosis purification systems have been designed to include a tap water inflow control valve responsive to filling of the storage reservoir, in order to reduce excessive water waste. More specifically, purification systems have been developed to incorporate a shut-off valve responsive to the pressure within a pressurized storage reservoir to halt tap water inflow to the system when the reservoir is filled. See, for example, U.S. Pat. No. 4,776,952. Other purification systems of the type having an unpressurized storage reservoir have included float-operated solenoid valves responsive to reservoir water level to halt tap water inflow when the reservoir reaches a substantially filled condition. Such electric solenoid devices are, however, relatively costly and include metal components which are conducive to corrosion-caused malfunction resulting in reservoir overflows.

The present invention relates to an improved and relatively cost efficient yet highly reliable mechanical float valve assembly for use in regulating tap water inflow to a purification system in response to the water level within a storage reservoir.

SUMMARY OF THE INVENTION

In accordance with the invention, an improved float valve assembly is provided for controlling water inflow to a water purification system, such as a purification system including a reverse osmosis module, in response to the water level within a storage reservoir. The float valve assembly comprises a valve unit defining a flow path from a tap water supply or the like to the reverse osmosis module, with a pair of primary and secondary valves mounted in series along said flow path. The primary and secondary valves are respectively operated by primary and secondary floats positioned within the reservoir for vertical displacement in response to rising and falling reservoir water level. The primary valve provides primary on-off regulation of water inflow to the purification module, while the secondary valve provides a backstop shut-off function in the event of primary valve malfunction.

In the preferred form, the flow path extends vertically through the valve unit, and the primary and secondary valves are mounted along said flow path so that the primary valve is disposed vertically below the secondary valve. With this geometry, the primary valve is operated by the associated primary float to provide normal on-off regulation of water inflow to the purification module while the secondary valve remains in an open position. In the event of primary valve malfunction, the reservoir water level will rise at least slightly above an upper limit sufficient to otherwise close the primary valve, whereupon the secondary float responds to such increased water level to displace the secondary valve to the closed position. In a preferred arrangement, a valve seat associated with the secondary valve is sized to insure that the secondary valve remains in the closed position in response to tap water pressure, upon subsequent descent of the reservoir water level, and a manually operable reset button is provided for manually re-opening the secondary valve.

The primary and secondary valves comprise a pair of banjo valves in association with a respective valve seat. Each banjo valve comprises a central valve disk or head coupled by a radial arm with an annular seal ring seated coaxially along the flow path through the valve unit. The associated float comprises a buoyant float member mounted at an outboard end of a float arm, which in turn has an inboard end extending through the annular seal ring and related radial arm to the valve head. When the water level within the reservoir rises sufficiently to move the float arm to a substantially horizontal orientation, the inboard end of the float arm carries the associated valve head to the closed position. Conversely, when the reservoir water level falls causing the float arm to extend angularly outwardly and downwardly from the valve unit, the inboard end of the float arm pivots the associated valve head sufficiently to unseat and move to the open position.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
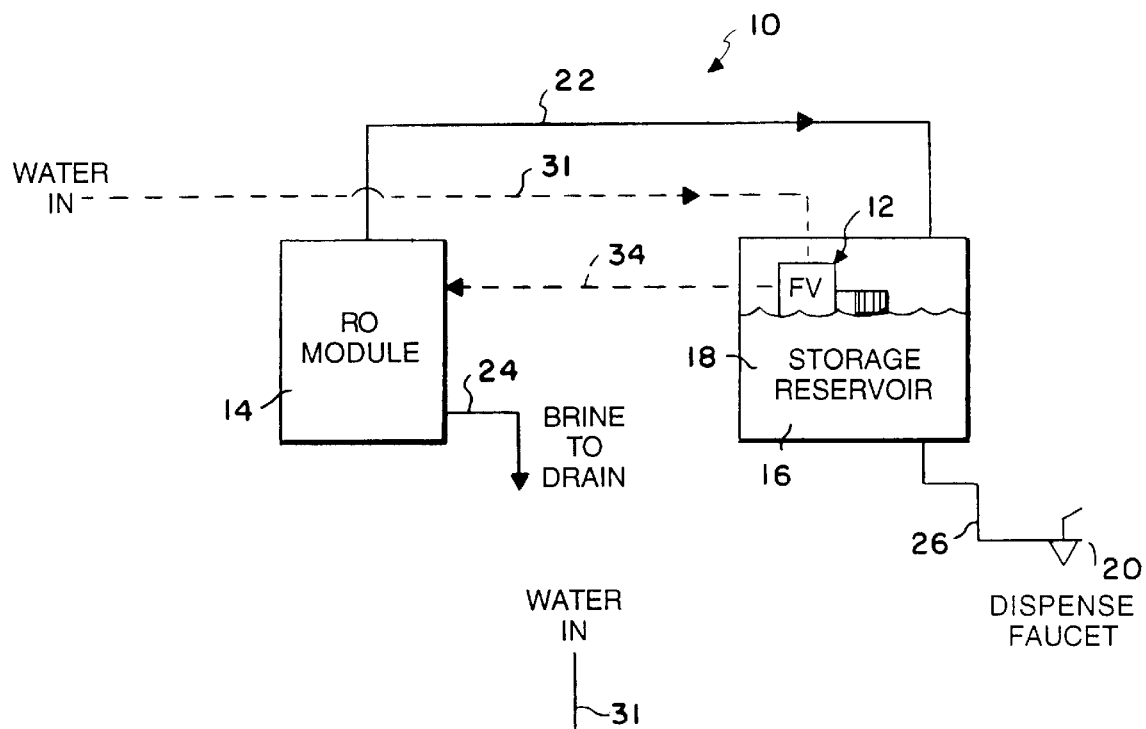
FIG. 1 is a schematic diagram of a water purification system including a reverse osmosis module, depicting use of a float valve assembly for regulating water inflow in response to the water level within a storage reservoir.

As shown in the exemplary drawings, a water purification system referred to generally in FIG. 1 by the reference numeral 10 includes an improved float valve assembly 12 for controlling water inflow to a purification or filtration element or module, such as the illustrative reverse osmosis module 14. The float valve assembly 12 is mounted within a reservoir 16 within which relatively purified water 18 produced by the reverse osmosis module 14 is collected and stored where it is ready for use by dispensing through a faucet 20 or the like. The float valve assembly 12 includes a pair of float-operated valves (not shown in FIG. 1) responsive to the water level within the reservoir 16 for on-off regulation of water inflow to the purification system.

The water purification system 10 is designed particularly for residential and other domestic applications to provide a ready supply of relatively purified water 18 produced from ordinary tap water or the like. As is known in the art, the purification system 10 utilizes principles of filtration and/or reverse osmosis to convert the incoming tap water supply into dual water outflows comprising the relatively purified water having contaminants substantially removed therefrom, and a waste or reject water supply having the contaminants or impurities concentrated therein. The produced purified water is normally coupled by a pure water conduit 22 for flow from the reverse osmosis module 14 to the storage reservoir 16, whereas the waste or reject water is normally coupled for flow from the reverse osmosis module through a drain conduit 24 to a suitable drain. The waste or reject water is often referred to brine. The faucet 20 is normally coupled via a dispense conduit 26 to the produced purified water, either by connection to the pure water conduit 22 or by connection directly to the reservoir 16. One exemplary reverse osmosis purification system of this type is shown and described in more detail in U.S. Pat. No. 5,045,197, which is incorporated by reference herein.

In the illustrative purification system 10 depicted in FIG. 1, the storage reservoir 16 receives and stores the produced purified water 18 under unpressurized, substantially atmospheric pressure conditions. In this regard, the flow conduits 22, 26 coupled to the reservoir 16 are arranged for gravity flow dispensing of the purified water 18 through the dispense conduit 26 to the faucet 20.

Figure 2:
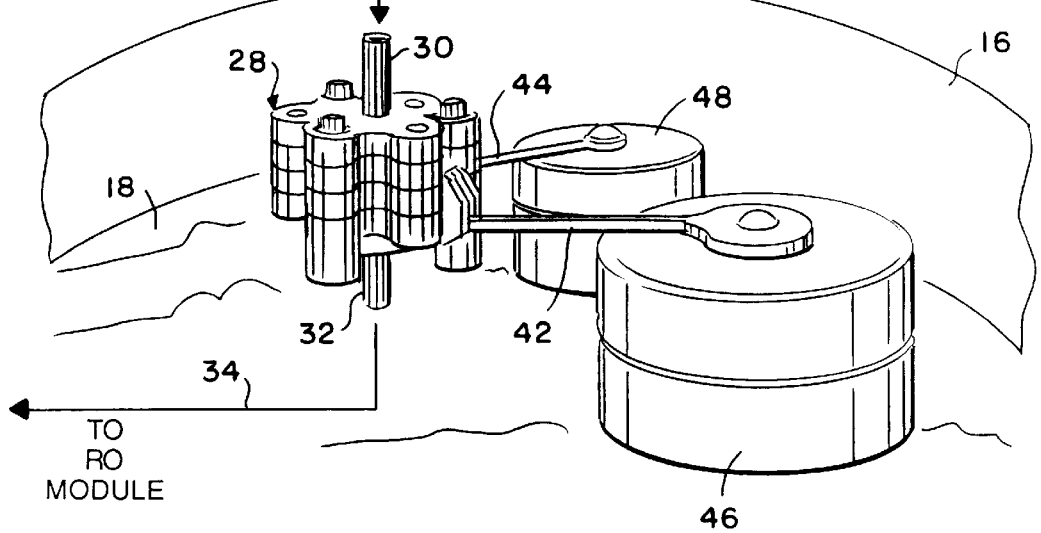
FIG. 2 is a fragmented perspective view illustrating the float valve assembly of the present invention installed within the storage reservoir.

The float valve assembly 12 of the present invention is mounted within an upper region of the reservoir 16 for float actuated response to the reservoir water level to control tap water inflow to the reverse osmosis module 14. More particularly, as viewed in FIG. 2, the valve assembly 12 generally comprises a valve unit 28 having an inlet fitting 30 adapted for connection by an inflow line 31 to the tap water source, and an outlet fitting 32 coupled by a supply line 34 to the reverse osmosis module 14. When the reservoir water level is relatively low, substantially less than a filled condition, the float valve assembly 12 permits water inflow to the reverse osmosis module 14 so that production of purified water and filling of the reservoir 16 may proceed. However, as the reservoir water level reaches a filled or substantially filled condition, the float valve assembly 12 shuts off the water inflow to the system and thereby prevents potentially substantial waste of water which would otherwise occur by flow through the reverse osmosis module 14 to the drain. Upon subsequent descent of the reservoir water level by dispensing a volume of the water 18 therein via the faucet 20, the float valve assembly 12 permits resumed tap water inflow to the system for resumed production of purified water.

Figure 3:
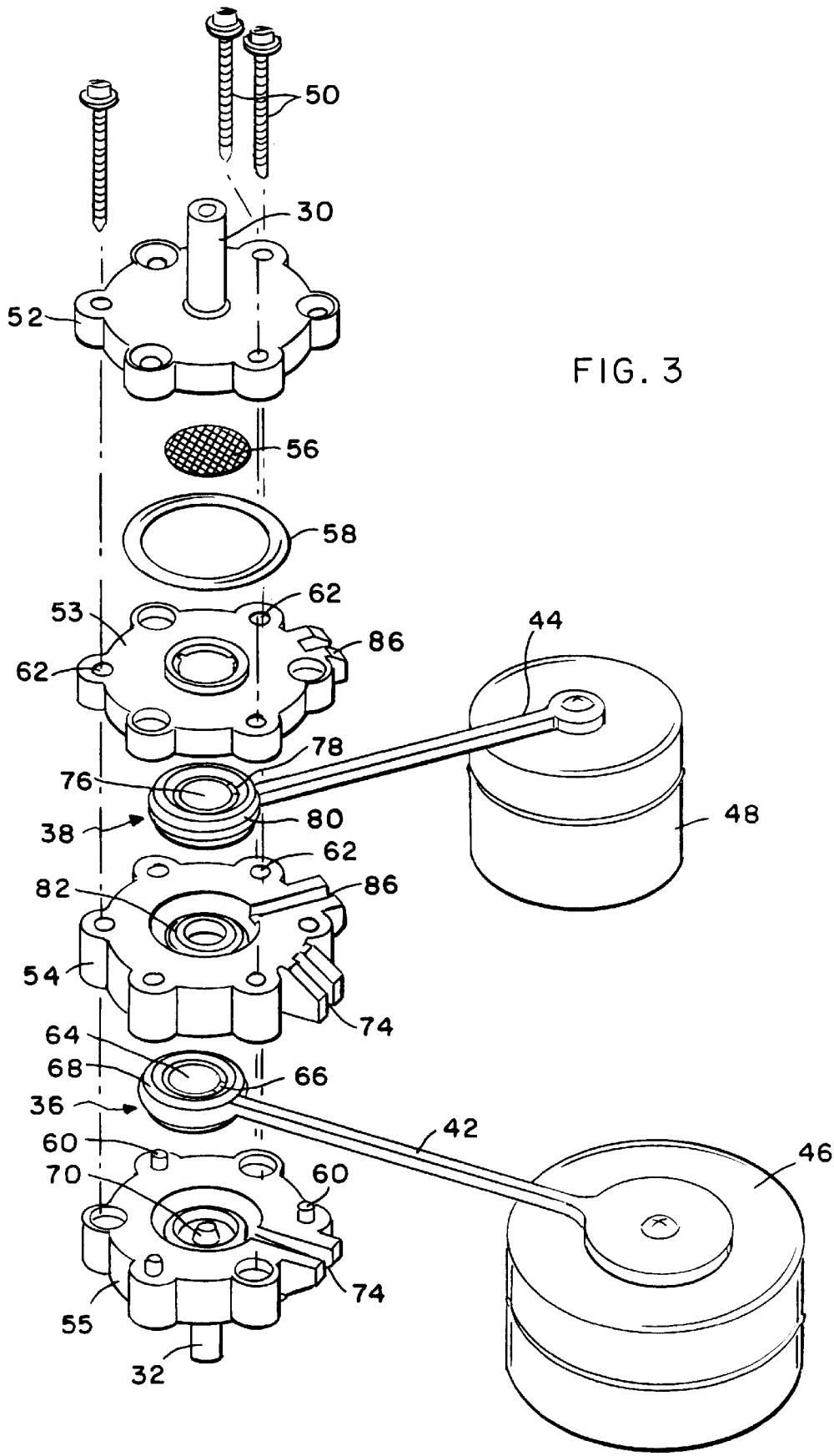
FIG. 3 is an exploded perspective view of the float valve assembly.

As shown in more detail in FIGS. 2–7, the float valve assembly 12 comprises a primary valve 36 and a secondary valve 38 (FIGS. 3 and 7) mounted in series along a flow path 40 (FIG. 7) formed in the valve unit 28 to extend generally vertically between the inlet and outlet fittings 30, 32. The two valves 36, 38 are individually and pivotally coupled to the inboard ends of a respective pair of float arms 42 and 44 which extend laterally therefrom to the exterior of the valve unit 28, terminating in outboard ends coupled respectively to a primary float 46 and a secondary float 48 (FIG. 3). In general terms, both the primary and secondary floats 46, 48 comprise buoyant members such as hollow canisters adapted to move vertically upwardly in response to a rising water level within the reservoir 16, for shifting their respective primary and secondary valves 36, 38 from an open position to a closed position along the flow path 40, all in a manner to be described in more detail. However, the secondary float 48 is positioned at a vertical elevation sufficiently above the primary float 46, so that the primary float 46 and its associated primary valve 36 provides the primary or normal on-off water flow control through the valve unit 28. The secondary float 48 and its associated secondary valve 38 provide backstop shut-off control in the event of primary float or primary valve malfunction.

The valve unit 28 comprises a plurality of housing plates mounted in a stacked array by means of a plurality of screws 50 (FIGS. 3 and 7) or the like. More particularly, an upper housing plate 52 includes the tubular inlet fitting 30 projecting upwardly therefrom for suitable connection to the tap water inflow line 31. This upper plate 52 is assembled in sequence with a pair of middle housing plates 53 and 54, the latter plate 54 being assembled in turn with a lower housing plate 55 defining the tubular outlet fitting 32. As shown best in FIG. 7, this assembly of housing plates 52–55 cooperatively defines the valve unit flow path 40. A strainer 56 is conveniently mounted between the upper two housing plates 52, 53 upstream from the primary and secondary valves 36, 38 to capture any large particulate which might otherwise interfere with valve unit operation. In addition, an appropriate seal ring 58 is also seated between the upper two housing plates 52, 53 to prevent water leakage therebetween. A plurality of vertically extending alignment pins 60 and related pin-receiving alignment ports 62 are formed in the housing plates 52–55 to insure correct interfitting assembly of the housing plates.

The primary valve 36 is mounted between the lower housing plates 54, 55. This primary valve 36 comprises a banjo-type valve having a central valve disk or head 64 formed from a resilient or elastomeric material and coupled integrally by a radial arm 66 with an outer and generally concentric annular seal ring 68 seated coaxially along the flow path 40 and captured between the housing plates 54, 55. The valve head 64 is positioned along the flow path 40 to overlie an annular primary valve seat 70 through which water flow to the outlet fitting 32 is regulated.

Figure 4:
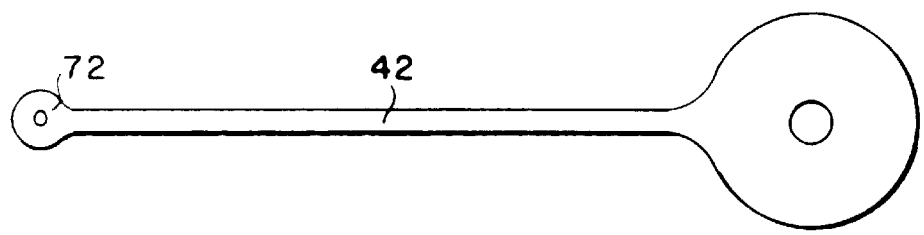
FIG. 4 is a plan view of a float arm for use in the float valve assembly.
Figure 5:
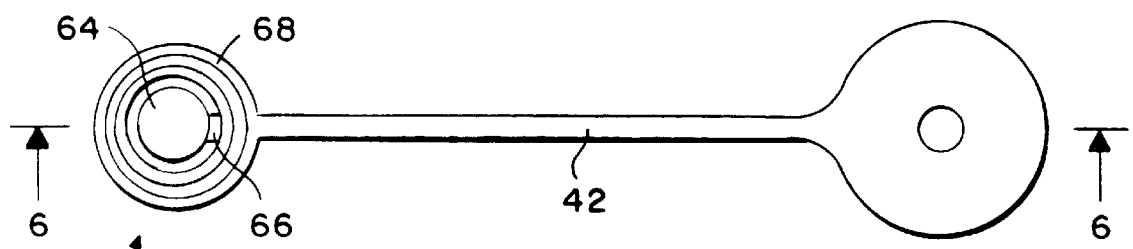
FIG. 5 is a plan view of the float arm of FIG. 4, assembled with a banjo-type valve.
Figure 6:
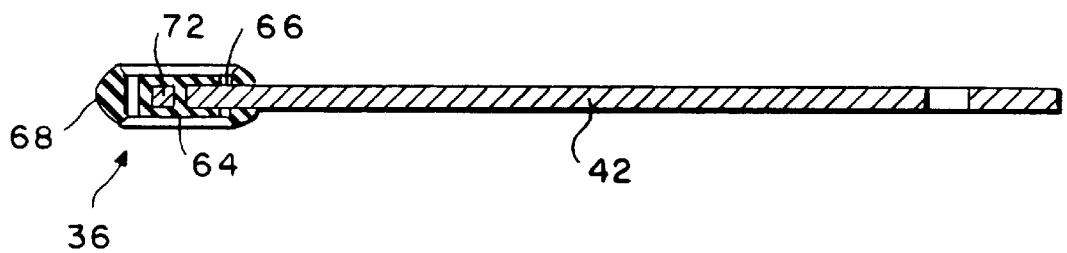
FIG. 6 is a longitudinal vertical sectional view taken generally on the line 6—6 of FIG. 5.
Figure 7:
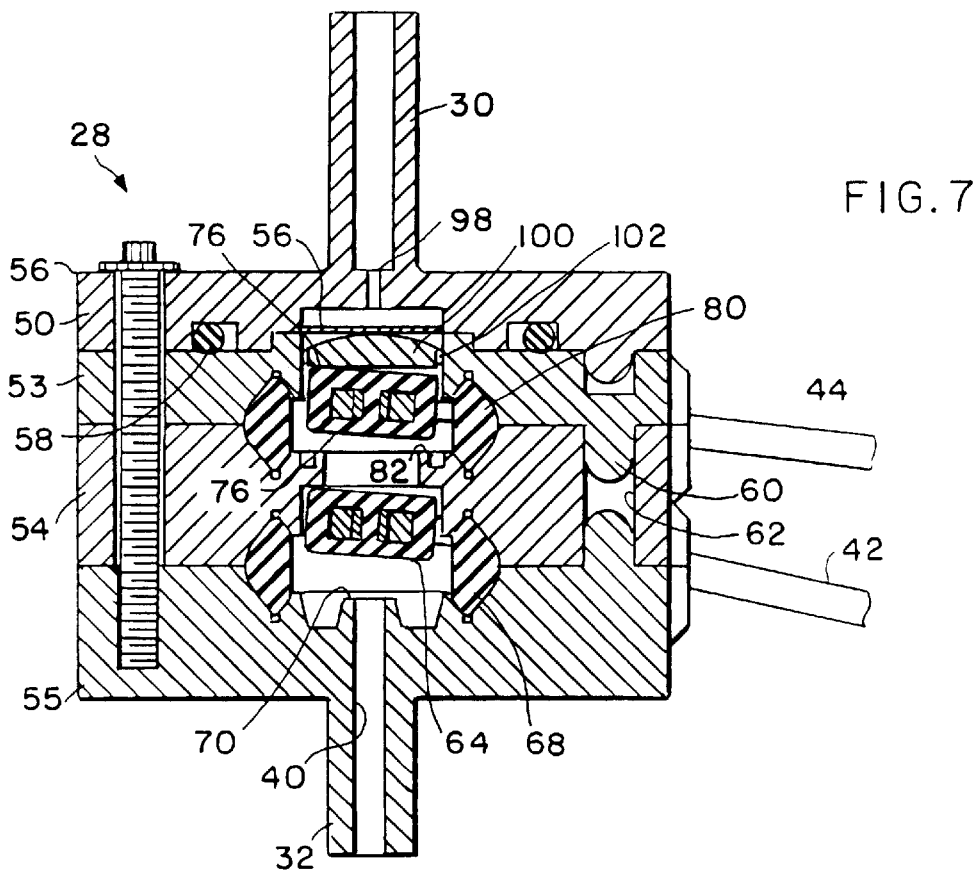
FIG. 7 is an enlarged vertical sectional view of a valve unit forming a portion of the float valve assembly, and showing primary and secondary valves in an open position.

The float arm 42 associated with the primary valve 36 has its inboard end terminating in a small ring 72, as shown in FIGS. 4 and 6. This inboard end ring 72 is secured to the primary valve 36, preferably by comolding thereof within the central valve head 64, as viewed in FIGS. 5–7. From the valve head 64, the float arm 42 extends through the radial valve arm 66, comolded therein, and further through the seal ring 68 to extend radially outwardly from the valve unit 28 through a radially open slot 74 (FIG. 3) defined cooperatively by the lower two housing plates 54, 55. An outboard end of the float arm 42 is connected suitably to the primary float 46.

Figure 8:
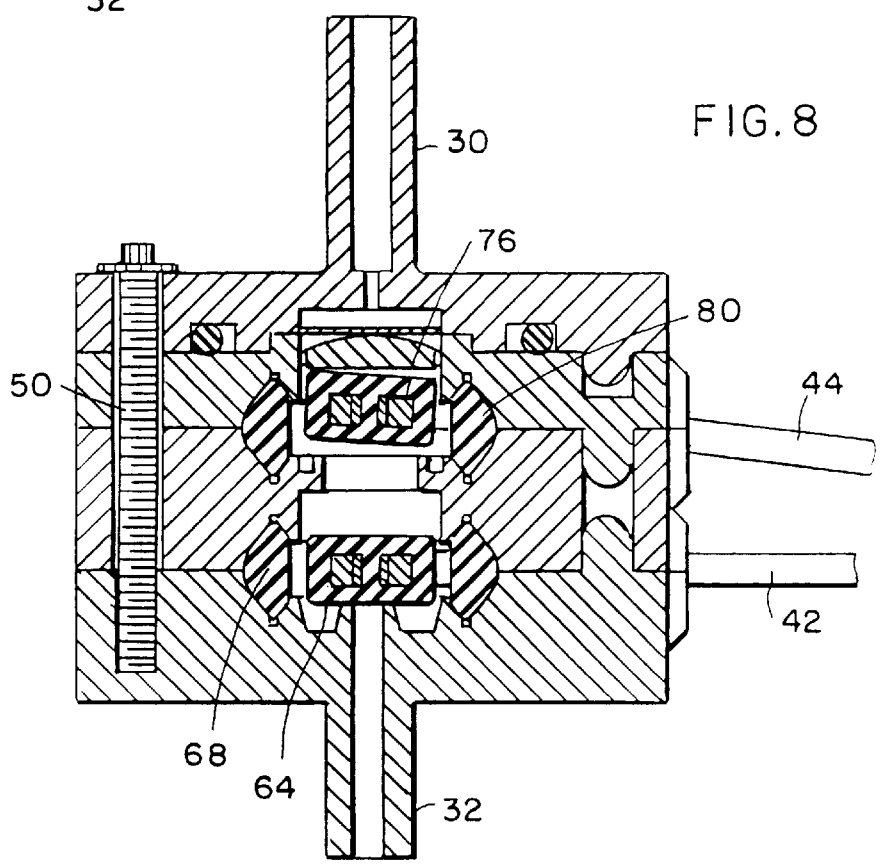
FIG. 8 is an enlarged vertical sectional view similar to FIG. 7, and depicting the primary valve in a closed position and the secondary valve in an open position.

In operation, the primary float 46 rises and falls according to the level of the purified water 18 within the reservoir 16. When the reservoir water level falls below a first predetermined level corresponding to a filled or substantially filled condition, the primary float 46 descends vertically so that the associated float arm 42 extends laterally outwardly and downwardly from the valve unit 28, as viewed in FIG. 7. In this orientation, the float arm 42 lifts the valve head 64 from the underlying valve seat 70 to permit water flow to the reverse osmosis module 14. However, when the water level within the reservoir 16 rises back to the first predetermined level, sufficient to cause the primary float 46 to lift the associated float arm 42 to a substantially horizontal attitude, as viewed in FIG. 8, the float arm 42 moves the valve head 64 downwardly to seat upon the valve seat 70 and thereby halt water inflow to the reverse osmosis module 14.

The secondary valve 38 is constructed and operates in a generally similar manner to the primary valve 36, except as detailed below. More particularly, secondary valve 38 is mounted between the middle pair of housing plates 53, 54. This secondary valve 38 also comprises a banjo-type valve having a central valve disk or head 76 formed from a resilient or elastomeric material and coupled integrally by a radial arm 78 with an outer and generally concentric annular seal ring 80 seated coaxially along the flow path 40 and captured between the housing plates 53, 54. The secondary valve head 76 is positioned to overlie an annular secondary valve seat 82 through which water flow to the outlet fitting 32 can be regulated. The float arm 44 associated with the secondary valve 38 has its inboard end terminating in a small ring 84 which preferably is comolded within the central valve head 76 (FIG. 7) in the same manner as shown and described with respect to the primary valve 36. From the secondary valve head 76, the float arm 44 extends through the radial valve arm 78, also comolded therein, and further through the seal ring 80 to extend radially outwardly through a radially open slot 86 (FIG. 3) defined cooperatively by the housing plates 53, 54. An outboard end of the float arm 44 is connected in turn to the secondary float 48.

Figure 9:
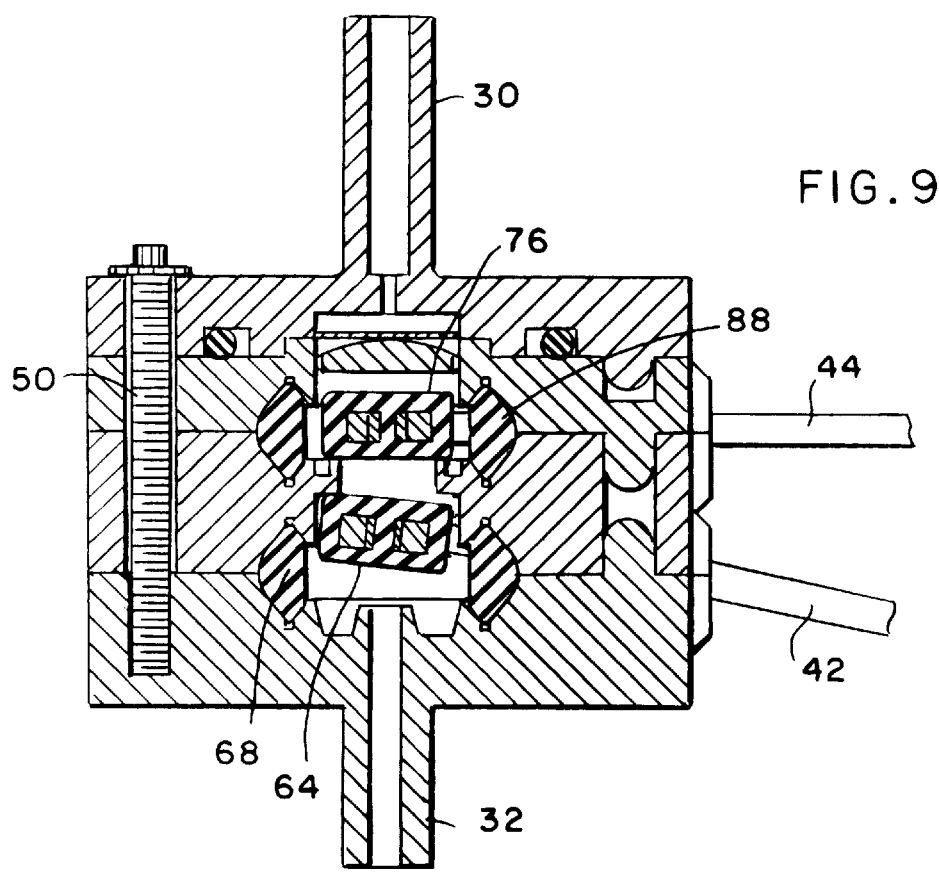
FIG. 9 is an enlarged vertical sectional view similar to FIG. 7, and showing the primary valve in an open position and the secondary valve in a closed position.

In operation, during normal on-off regulation of the reservoir water level by the primary valve 36, the rising and falling reservoir water level does not rise sufficiently to move the secondary valve 38 from a normal open condition. That is, as viewed in FIG. 7, the secondary float 48 is normally not elevated by the reservoir water level, whereby the associated float arm 44 normally extends angularly downwardly from the valve unit 28 to lift or cock the secondary valve head 76 to the open position. However, in the event of malfunction of the primary valve 36 or the primary float 46, the level of the purified water 18 within the reservoir 16 will rise to a second predetermined level slightly above the first level normally required to closed the primary valve head 64. When this occurs, the secondary float 48 will lift associated float arm 44 to a substantially horizontal attitude, as viewed in FIG. 9, so that the float arm 44 will move the secondary valve head 76 downwardly to seat upon the valve seat 82 and thereby halt water inflow to the reverse osmosis module 14.

In accordance with a further aspect of the invention, subsequent dispensing of water from the reservoir 16 resulting in a lowered water level within the reservoir does not automatically cause the secondary valve 38 to re-open. Instead, the open area defined by the secondary valve seat 82 is sufficiently large, so that the net downward closure force applied to the valve head 76 attributable to normal tap water pressure at the upper side thereof is sufficient to hold the secondary float 48 and the associated float arm 44 in a closed attitude despite subsequent water level descent. Accordingly, with this arrangement, while lowering of the reservoir water level below the second predetermined level permits movement of the primary valve 36 back to the open position, manual intervention for re-opening of the secondary valve 38 is required before pure water production can resume. This requirement for manual reopening of the secondary valve serves as an alert that a system malfunction has occurred, and that remedial service is needed.

Figure 10:
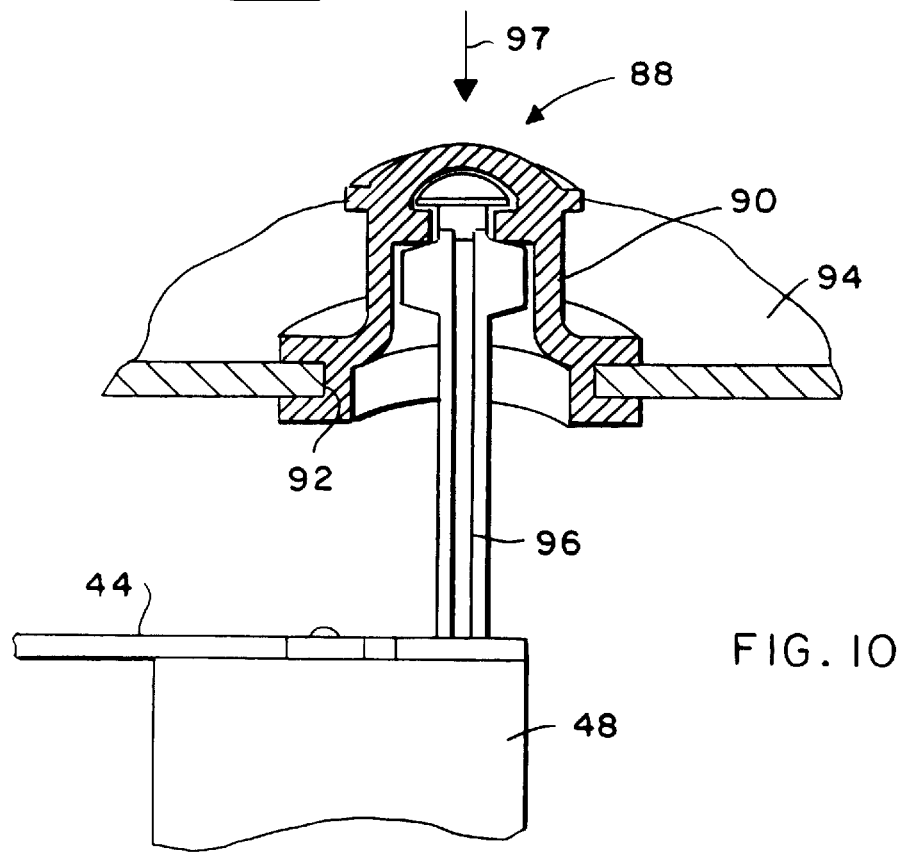
FIG. 10 is an enlarged fragmented perspective view illustrating a reset button for reopening the secondary valve, subsequent to water level responsive closure thereof.

FIG. 10 shows a manual reset button 88 for use in manually re-opening the closed secondary valve 36. As shown, the reset button 88 comprises a resilient dome-shaped member 90 mounted within a reset port 92 formed in a lid or top wall 94 of the reservoir 16. A reset pin 96 is captured at the underside of the member 92 and protrudes downwardly within the reservoir to a position closely overlying the secondary float 48. When re-opening of the secondary valve 38 is required, manual depression of the button 88 as indicated by arrow 97 in FIG. 10 displaces the reset pin 96 downwardly against the secondary float 48, to push the secondary float back downwardly to a position wherein the float arm 44 lifts the secondary valve head 76 back to the normal open position. The resilient member 90 has sufficient inherent spring characteristics to retract upwardly to a normal position (as viewed in FIG. 10) following such reset depression.

In accordance with still further aspects of the invention, the valve unit 28 further includes a flow restrictor 98 in the form of an orifice formed in the upper housing plate 52 (FIG. 7) upstream from the primary and secondary valves 36, 38. This flow restrictor 98 has an internal diameter and length sufficient to control the water flow rate through the valve unit 28 to a relatively slow rate suitable for production of purified water, within a typical pressure range for tap water sources. In addition, a flow diverter 100 (FIG. 7) may be integrally molded within the housing plate 53, or otherwise suitably mounted therein, and comprises a diverter disk mounted centrally along the flow path 40 upstream from the secondary valve 38 and defining an annular passage in the form of an array of diverter ports 102 through which the tap water inflow can flow downwardly toward the secondary valve 38. With this construction, when the primary and secondary valves 36, 38 are both open for water flow to the reverse osmosis unit 14, the diverter disk 100 prevents the water downflow from undesirably impacting and displacing the secondary valve head 76 to the closed position. Instead, the diverter disk 100 causes the water to flow downwardly in a generally annular pattern about the periphery of the valve head 76 for flow through the open valve seat 82.

The float valve assembly 12 of the present invention thus provides for float activated mechanical operation of the series-mounted primary and secondary valves 36, 38 in response to changing water level within the storage reservoir 16. Primary on-off regulation of tap water flow is provided by the primary valve 36, with the secondary valve 38 acting as a safety backup to shut off the tap water inflow in the event of primary valve failure.

A variety of further modifications and improvements in and to the float valve assembly 12 of the present invention will be apparent to those persons skilled in the art. Accordingly, no limitation on the invention is intended by way of the foregoing description and accompanying drawings, except as set in the appended claims.

What is claimed is:

1. A float valve assembly for regulating water inflow to a water purification system having a purification module and a reservoir for storing produced purified water, said float valve assembly comprising:

a valve unit defining a flow path having an inlet adapted for connection to a water source and an outlet adapted for connection to a purification module, and a primary valve and a secondary valve mounted along said flow path, each of said primary and secondary valves being movable between open and closed positions respectively permitting and preventing water flow through said flow path to the purification module;

a primary float arm having an inboard end connected to said primary valve for moving said primary valve between said open and closed positions;

a primary float coupled to an outboard end of said primary float arm and responsive to the level of water within a reservoir for moving said primary float arm to displace said primary valve from said open position to said closed position when the water level rises to a first predetermined level, and for moving said primary float arm to displace said primary valve from said closed position to said open position when the water level falls below said first predetermined level;

a secondary float arm having an inboard end connected to said secondary valve for moving said secondary valve between said open and closed positions; and a secondary float coupled to an outboard end of said secondary float arm and responsive to the level of water within the reservoir for moving said secondary float arm to displace said secondary valve from said open position to said closed position when the water level rises to a second predetermined level higher than said first level, and for allowing movement of said secondary float arm to displace said secondary valve from said closed position to said open position when the water level falls below said second predetermined level;

each of said primary and secondary valves comprising a banjo valve having a central valve head disposed generally concentrically within an outer annular seal ring and interconnected thereto by a radial arm, and further wherein said inboard end of each of said primary and secondary float arms is comolded within said associated valve head and extends therefrom through said associated radial arm and seal ring to protrude outwardly from said valve unit to said outboard end thereof connected to the associated one of said primary and secondary floats.

2. The float valve assembly of claim 1 wherein said valve unit is mounted within the reservoir.

3. The float valve assembly of claim 1 wherein said flow path is vertically oriented.

4. The float valve assembly of claim 3 wherein said secondary valve is mounted along said flow path at a location vertically above said primary valve.

5. The float valve assembly of claim 1 further including a filter strainer mounted along said flow path upstream from said primary and secondary valves for capturing water-borne particulate.

6. The float valve assembly of claim 1 further including a flow diverter mounted along said flow path upstream from said primary and secondary valves for preventing water flow along said flow path from applying a substantial closure force to said primary valve.

7. The float valve assembly of claim 6 wherein said flow diverter comprises means forming a generally annular flow passage for water flow therethrough.

8. The float valve assembly of claim 1 further including a flow restrictor mounted along said flow path upstream from said primary and secondary valves and defining an internal bore with a longitudinal length sufficient to provide a relatively slow flow rate of water therethrough.

9. The float valve assembly of claim 1 wherein said valve unit further defines a primary valve seat engaged by said primary valve in said closed position, and a secondary valve seat engaged by said secondary valve in said closed position, said secondary valve seat having a size relative to water pressure at said inlet for retaining said secondary valve in said closed position when the water level falls below said second predetermined level.

10. The float valve assembly of claim 9 further including reset means for manually displacing said secondary valve from said closed position to said open position.

11. The float valve assembly of claim 10 wherein said reset means comprises a reset button mounted on the reservoir and including means for displacing said secondary float downwardly upon depression of said reset button.

12. A float valve assembly for regulating water inflow to a water purification system having a purification module and a reservoir for storing produced purified water, said float valve assembly comprising:

a valve unit for mounting within a reservoir and defining a vertically oriented flow path having an inlet adapted for connection to a water source and an outlet adapted for connection to a purification module, and a primary valve and a secondary valve mounted along said flow path, each of said primary and secondary valves being movable between open and closed positions respectively permitting and preventing water flow through said flow path to the purification module, and said secondary valve being disposed along said flow path vertically above said primary valve;

a primary float arm having an inboard end connected to said primary valve for moving said primary valve between said open and closed positions;

a primary float coupled to an outboard end of said primary float arm and responsive to the level of water within the reservoir for moving said primary float arm to displace said primary valve from said open position to said closed position when the water level rises to a first predetermined level, and for moving said primary float arm to displace said primary valve from said closed position to said open position when the water level falls below said first predetermined level;

a secondary float arm having an inboard end connected to said secondary valve for moving said secondary valve between said open and closed positions; and a secondary float coupled to an outboard end of said secondary float arm and responsive to the level of water within the reservoir for moving said secondary float arm to displace said secondary valve from said open position to said closed position when the water level rises to a second predetermined level higher than said first level, and for allowing movement of said secondary float arm to displace said secondary valve from said closed position to said open position when the water level falls below said second predetermined level;

each of said primary and secondary valves comprising a banjo valve having a central valve head disposed generally concentrically within an outer annular seal ring and interconnected thereto by a radial arm, and further wherein said inboard end of each of said primary and secondary float arms is co-molded within said associated valve head and extends therefrom through said associated radial arm and seal ring to protrude outwardly from said valve unit to said outboard end thereof connected to the associated one of said primary and secondary floats.

13. The float valve assembly of claim 12 further including a filter strainer mounted along said flow path upstream from said primary and secondary valves for capturing water-borne particulate.

14. The float valve assembly of claim 12 further including a flow diverter mounted along said flow path upstream from said primary and secondary valves for preventing water flow along said flow path from applying a substantial closure force to said primary valve.

15. The float valve assembly of claim 14 wherein said flow diverter comprises means forming a generally annular flow passage for water flow therethrough.

16. The float valve assembly of claim 12 further including a flow restrictor mounted along said flow path upstream from said primary and secondary valves and defining an internal bore with a longitudinal length sufficient to provide a relatively slow flow rate of water therethrough.

17. The float valve assembly of claim 12 wherein said valve unit further defines a primary valve seat engaged by said primary valve in said closed position, and a secondary valve seat engaged by said secondary valve in said closed position, said secondary valve seat having a size relative to water pressure at said inlet for retaining said secondary valve in said closed position when the water level falls below said second predetermined level.

18. The float valve assembly of claim 17 further including reset means for manually displacing said secondary valve from said closed position to said open position.

19. The float valve assembly of claim 18 wherein said reset means comprises a reset button mounted on the reservoir and including means for displacing said secondary float downwardly upon depression of said reset button.

20. A float valve assembly for regulating water inflow to a reservoir, said float valve assembly comprising:

a valve unit defining a flow path having an inlet adapted for connection to a water source and an outlet adapted for connection in flow communication to a reservoir, and a primary valve and a secondary valve mounted along said flow path, each of said primary and secondary valves being movable between open and closed positions respectively permitting and preventing water flow through said flow path;

a primary float arm having an inboard end connected to said primary valve for moving said primary valve between said open and closed positions;

a primary float coupled to an outboard end of said primary float arm and responsive to the level of water within a reservoir for moving said primary float arm to displace said primary valve from said open position to said closed position when the water level rises to a first predetermined level, and for moving said primary float arm to displace said primary valve from said closed position to said open position when the water level falls below said first predetermined level;

a secondary float arm having an inboard end connected to said secondary valve for moving said secondary valve between said open and closed positions; and a secondary float coupled to an outboard end of said secondary float arm and responsive to the level of water within the reservoir for moving said secondary float arm to displace said secondary valve from said open position to said closed position when the water level rises to a second predetermined level higher than said first level, and for allowing movement of said secondary float arm to displace said secondary valve from said closed position to said open position when the water level falls below said second predetermined levels;

said primary valve comprising a banjo valve having a central valve head disposed generally concentrically within an outer annular seal ring and interconnected thereto by a radial arm, and further wherein said inboard end of said primary float arm is co-molded within said valve head and extends therefrom through said radial arm and seal ring to protrude outwardly from said valve unit to said outboard end thereof connected to said primary float.

21. The float valve assembly of claim 20 wherein said valve unit is mounted within the reservoir.

22. The float valve assembly of claim 20 wherein said flow path is vertically oriented.

23. The float valve assembly of claim 22 wherein said secondary valve is mounted along said flow path at a location vertically above said primary valve.

24. The float valve assembly of claim 20 wherein said secondary valve comprises a banjo valve having a central valve head disposed generally concentrically within an outer annular seal ring and interconnected thereto by a radial arm, and further wherein said inboard end of said secondary float arm is co-molded within said valve head and extends therefrom through said radial arm and seal ring to protrude outwardly from said valve unit to said outboard end thereof connected to said secondary float.

25. The float valve assembly of claim 20 further including a filter strainer mounted along said flow path upstream from said primary and secondary valves for capturing water-borne particulate.

26. The float valve assembly of claim 20 further including a flow diverter mounted along said flow path upstream from said primary and secondary valves for preventing water flow along said flow path from applying a substantial closure force to said primary valve.

27. The float valve assembly of claim 26 wherein said flow diverter comprises means forming a generally annular flow passage for water flow therethrough.

28. The float valve assembly of claim 20 further including a flow restrictor mounted along said flow path upstream from said primary and secondary valves and defining an internal bore with a longitudinal length sufficient to provide a relatively slow flow rate of water therethrough.

29. The float valve assembly of claim 20 wherein said valve unit further defines a primary valve seat engaged by said primary valve in said closed position, and a secondary valve seat engaged by said secondary valve in said closed position, said secondary valve seat having a size relative to water pressure at said inlet for retaining said secondary valve in said closed position when the water level falls below said second predetermined level.

30. The float valve assembly of claim 29 further including reset means for manually displacing said secondary valve from said closed position to said open position.

31. The float valve assembly of claim 30 wherein said reset means comprises a reset button mounted on the reservoir and including means for displacing said secondary float downwardly upon depression of said reset button.

* * * * *